…

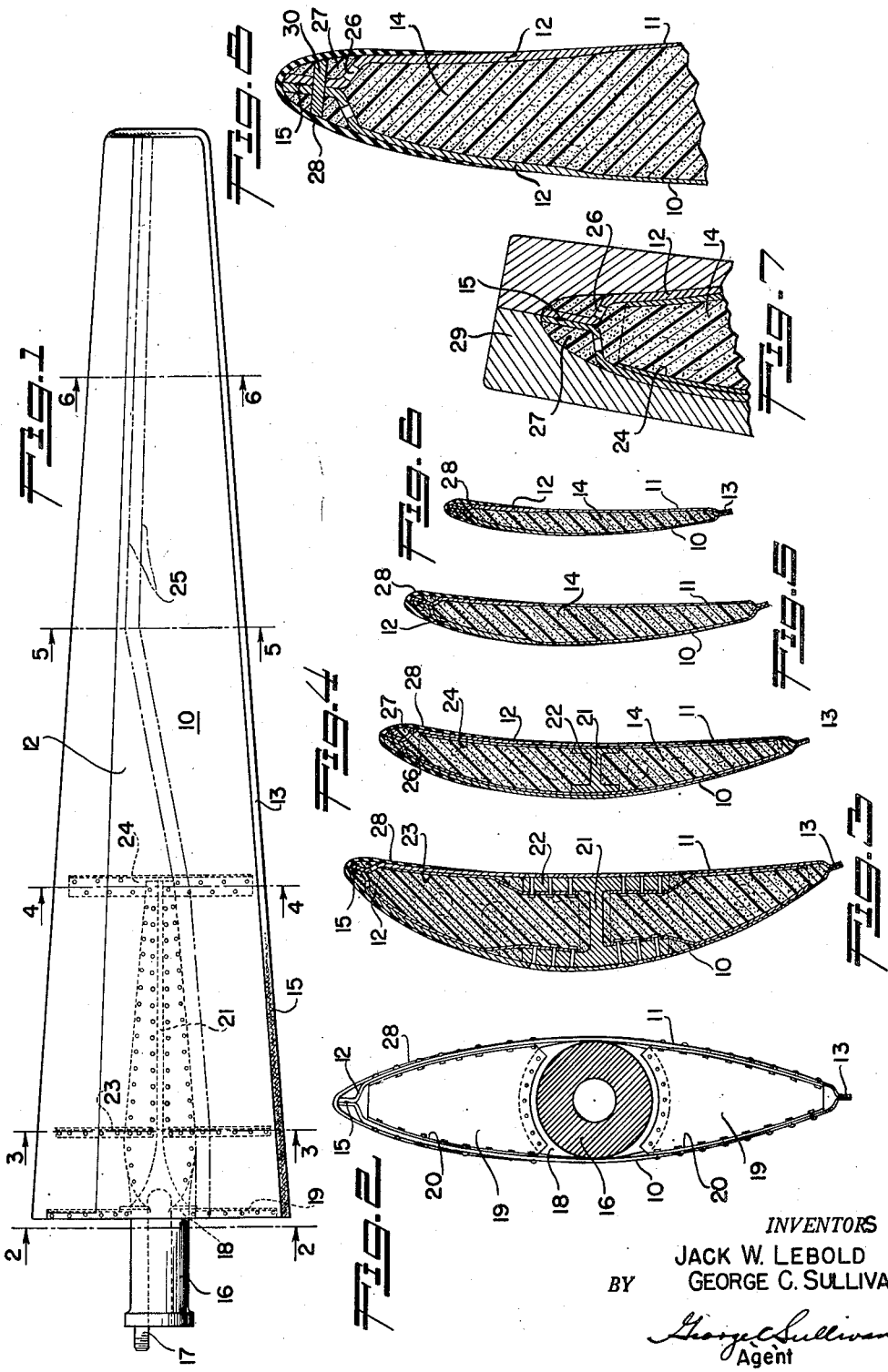

United States Patent Office 2,767,461
Patented Oct. 23, 1956

2,767,461

METHOD OF MAKING PROPELLER OR ROTOR BLADE

Jack W. Lebold, Los Angeles, and George C. Sullivan, Hollywood, Calif., assignors to Lockheed Aircraft Corporation, Burbank, Calif.

Application March 27, 1951, Serial No. 217,802

3 Claims. (Cl. 29—156.8)

This invention relates to propeller or rotor blades of light weight and high strength construction to develop improved disc loading at lower rotative speeds, and to methods of making the same.

It is an object of this invention to provide a skin-stressed high strength, light weight blade or rotor structure suitable for the purposes intended, having preformed sheet metal skins secured together, with a minimum of internal metallic structure transmitting the skin loads into the blade or rotor hub, wherein the skins are supported by a strong internal cellular resin core structure foamed in place and self-bonding to the inner surfaces of said skins. The strength of the resulting stressed skin blade or rotor section is dependent on the bond between the cellular resin core and the skin, which bond must resist tension and shear stresses, as well as support the skin by the crushing strength of the core.

It is a further object of this invention to facilitate the manufacture and assembly of propeller or rotor blades by preforming half skins with outstanding peripheral flanges to permit spot or seam welding of said flanges together, and to provide for fairing the leading edge of the blade to produce the desired final contour by allowing the core material to extrude into a mold to form such a faired contour covering such outstanding flanges.

It is also an important object of this invention to provide a novel, improved and simplified method of making propeller and rotor blades of the type described wherein the metal skins and hub structure are preformed and assembled to form a sheath, and thereafter filled with a cellular resin core further bonding all parts together, the core material being foamed in place to fill all voids, during the expansion of the resin. It has heretofore been attempted to produce skin-stressed laminated structures wherein skins are applied to a preformed core of cellular resin, as for example wrapping such a core with resin impregnated fibre glass fabric and then curing the resin in such fabric; but as far as is known no successful structure has been produced by foaming and bonding the core material in situ in a completed shell, particularly wherein such shell is formed of a metallic material.

Other and further objects and advantages of this invention will be apparent from a consideration of the detailed description and claims, and the accompanying drawings which illustrate one embodiment of the invention.

In the drawings:

Figure 1 is a plan view of a propeller blade constructed in accordance with, and embodying the features of this invention; the usual variation in angular pitch of the blade along the length thereof, having been omitted to simplify the showing of the various sections hereinafter referred to.

Figure 2 is an enlarged cross section through the blade hub taken on the line 2—2 of Figure 1, showing the root end of the blade in elevation.

Figure 3 is a section on the line 3—3 of Figure 1 showing the intermediate rib secured to both skins and to the tongue of the blade hub.

Figure 4 is a section on the line 4—4 of Figure 1 showing the outer rib and end of the hub tongue.

Figure 5 is a section on the line 5—5 of Figure 1.

Figure 6 is a section on the line 6—6 of Figure 1.

Figure 7 is an enlarged fragmentary detail of the nose section of Figure 4 having a nose forming and skin supporting mold applied thereto.

Figure 8 is an enlarged fragmentary detail of the nose section of Figure 5 to better show the final nose configuration.

Referring to the drawings, we have shown a propeller blade intended to form an element of a six blade counter rotating adjustable pitch propeller installation of exceptionally large diameter and slow speed type intended to produce optimum propeller efficiency at a thrust to shaft horse power ratio exceeding 5½, under conditions where the ratio of shaft horsepower to the square of the diameter of the propeller approximates 4. The previously mentioned thrust to horsepower ratio greatly exceeds anything heretofore accomplished with conventional propellers.

The distinction normally drawn between propellers and helicopter rotors is in the cycling mechanism and low ratio of horsepower to the square of the diameter in the latter, and the blade twist in the former. Propeller blade twist (not shown in the drawing) progressively decreases the angle of attack outwardly from the root of the blade, to compensate for the increasing circumferential velocities along the blade, to theoretically maintain a uniform rate of air flow or velocity through the propeller disc.

The propeller blade as shown in Figure 1 is built up as an assemblage of complementary top and bottom thin sheet metal skins 10 and 11 which are tapered in thickness so as to be of heavier gauge indicated at 12 in the nose or leading edge portion of the blade than in the trailing edge portion thereof. The ratio of thickness may be as much as four to one because most of the load is on the nose section. Both of these skins 10 and 11 are preformed to the desired outline, blade twist, and sheet thickness taper by conventional manufacturing processes, and peripheral mating flanges 13 are formed around the periphery thereof to be later joined by spot or seam welding procedures variously indicated at 15 in the different figures.

A blade hub or pivot 16 provides for retaining the completed blade in position in a propeller hub, not shown, and an eccentric pin 17 on the inner end of the pivot 16 is provided for rotating the blade relative to the propeller hub in connection with pitch changing or control mechanisms of the types used in variable pitch or constant speed propeller control devices or governors. The hub or pivot 16 is provided with an outstanding collar 18 adjacent the root ends of the blade skins, to which collar the web of flanged rib like members 19 are later fastened, the flanges 20 on said members being in turn secured, as by riveting, to the root ends of the skins 10 and 11. On the blade side of the collar 18 and projecting part way between the skins is a tapered tongue 21 having flanges 22 for attachment to both skins, this tongue also carrying flanged ribs 23 and 24 also attached to the skins to distribute and transfer skin stresses into the tongue. The thicker gauge skin 12 used for the nose or leading edge section is carried back from the leading edge as far as the tongue fastenings to the skin, in order to provide a more rigid nose section, while outboard of the end of the tongue it is of reduced width as shown by the phantom lines 25 in Figure 1.

With the foregoing described arrangement, blade stresses, which are most severe in the nose section and decrease outwardly from the root, are distributed or transmitted to the ribs and to the tongue flanges 22 and thence to the hub or pivot 16. That portion of the blade outboard of the outer rib 24 is stiffened both by the heavier gauge metal in the nose section and by a structural supporting core 14, cast into the entire blade interior, as will later be described; such core material being forced through perforations 26 in the skins adjacent to the leading edge mating flanges, so that this portion 27 of the core thus fairs out the discontinuity caused by the flanges, being later covered by an abrasion resistant layer of rubber or stainless steel 28.

Prior to casting the supporting and skin stabilizing core into the shell, to be next described, the tongue 21, together with the outer rib 24, are riveted to one of the skins 10 or 11 and the other skin 11 or 10 applied thereover, and riveted to the rib and tongue through the open root end, either before or after the mating flanges 13 are spot or seam welded together around the periphery of the two skins. The two halves of the rib 23 are then inserted and riveted from the open root, and the riblike members 19 then applied before casting the core material 14 into the blade. Prior to the core casting operation, the entire blade sheath is clamped in a split mold 29, partly shown in Figure 7, to support the skins during the core casting operation, which develops internal pressure during the foaming reaction. The mold also defines the shape of the extruded core material 27 which covers the leading edge flange 12.

Suitable core materials which are self-bonding to the surfaces of the skins, ribs, and tongue comprise alkyd resin-diisocyanate cellular or foamed resin compounds such as are disclosed in the Simon and Thomas application filed February 17, 1949, S. N. 77,058, now Patent No. 2,591,884 entitled Alkyd Resin-Diisocyanate Cellular Foamed Plastics. Foamed cores of this material can be compounded to produce densities ranging from four to thirty pounds per cubic foot. As a specific example of such a foamed core material having a density of from 8 to 10 pounds per cubic foot, the following formulae may be used:

30 parts by weight of a compound of trimethylol propane, 4 mols; adipic acid, 2.5 mols; and phthalic anhydride 0.5 mol; the compound having a water content of 1%.

22 parts by weight meta-toluene diisocyanate containing 2 grams ethyl cellulose, having a viscosity of 7 centipoises and an ethoxyl content of from 46.8 to 48.5%, per 100 grams of the meta-toluene diisocyanate.

2.5 parts by weight diallyl phenyl phosphmati containing 5% by weight of benzoyl peroxide.

A sufficient quantity of this material is mixed immediately before pouring into the sheath formed by the assembled skins 10 and 11 and the resulting exothermic reaction causes foaming which expands the core to fill the sheath and nose section. Normally the reaction produces a preliminary set of the resin in cellular form, in a few moments, allowing removal of the blade from the mold in a short time. If desired the blade may then be set aside to age, or alternatively the full strength of the core may be developed by application of moderate heat for a few minutes.

A foamed resin core of this type having a density of 8½ pounds to the cubic foot has developed a tensile strength of 285 pounds, a compressive strength of 270 pounds, and a shear strength of 135 pounds, all in terms of a square inch area; and the self-bonding effect resulting from casting or foaming in place will develop the full strength of the core material at the bond surfaces with the skins thereby stabilizing the skins to maintain the surface contour under aerodynamic loads.

Alternative materials for the core may be a cellular polyester plastic, a cellular phenolic plastic, or the like, in which the foaming reaction is produced by the addition of bicarbonate of soda or the like, aided if desired by one or more catalysts to the plastic or resin prior to the casting and curing operations. This type of foamed plastic or resin has less strength than that previously described but will serve the purpose satisfactorily under lighter loading, or if given greater density or greater support, as by heavier gauge skin and rib members.

The novel method of producing propeller and rotor blades of the type described results in an aerodynamically and structurally improved blade or rotor of greatly increased strength for a given weight and skin thickness and thereby greatly reduces the power needed to drive such relatively large diameter propellers or rotors of relatively slow rotative speeds, to produce the maximum thrust for the given power.

In essence, the novel method of constructing propeller and rotor blades comprises the preparation of pre-shaped or formed metal skins, wherein the leading edge or nose portions of the skins are preferably substantially thicker than the trailing edge portions thereof; providing peripheral mating flanges on each skin, to be joined by spot or seam welding or other types of fastenings to produce a sheath, within which a cellular or foamed core is cast to stabilize the surface skins. In order to stabilize a thin stressed skin structure the skins must be bonded to the core material, which we accomplish by casting or foaming a cellular resin or plastic within the sheath formed by the thin surface skins. During the foaming or casting operation the surface skins are supported against the internal pressure developed by the foaming reaction by an enveloping mold, which also provides a nose form into which the foaming resin is extruded to envelop the leading edge flanges. In order to prevent the foamed resin from bonding to the mold, the latter can be coated with a repellant such as mineral oil, applied to the mold areas intended to be in contact with the foamed resin.

After the core material 14 has solidified in place the blade may be statically and dynamically balanced by the addition of weights applied at suitable points along the peripheral flanges 13. In the case of the leading edge flanges a suitable hole may be drilled through the core 27 and flange 13 to receive a weight 30 which would later be covered by the abrasion resistant cover 28, as shown in Figure 8.

It will thus be seen that we have invented an improved rotor and propeller blade structure and method of producing the same which is capable of producing a high thrust and low weight for low power loadings.

Having thus described our invention and the present preferred embodiments thereof, we desire to emphasize the fact that many modifications may be resorted to in a manner limited only by a just interpretation of the following claims.

We claim:

1. The method of making skin stressed propeller and rotor blades wherein the skin is stabilized by a cellular resin core, comprising preforming sheet metal half skins having outstanding mating flanges around the desired aerodynamic surface contours, joining the flanges of said skins together to form a sheath, perforating said skins adjacent the mating flanges thereof on the leading edge side of the blade, applying a mold to the sheath to support the same and to define a desired leading edge contour surrounding the mating flanges of said skin at the leading edge region thereof, then forming a cellular resin core between said skins and bonded to said skins by introducing a reactant resin material into said sheath and allowing said material to react in situ in said sheath to form said cellular resin core, and to pass through the perforated skins and occupy the leading edge portion of said mold to form the desired leading edge contour with the core material.

2. The method of making skin stressed propeller and rotor blades wherein the skin is stabilized by a cellular resin core bonded thereto, comprising preforming tapered thickness metal half skins to the desired aerodynamic contour, with the thicker portions of the skins forming the nose portion of the blade section, perforating said skins adjacent the nose portions thereof, joining the half skins to form a sheath for the cellular resin core, enclosing said sheath in a mold to support the same and to define the desired leading edge contour thereof, and introducing reactant cellular forming resin core material within said skin sheath for expansion therein to form the cellular core self-bonded to the inner surfaces of the sheath formed by said skin, said core material extruding through said perforations to fill the mold applied to the nose portion of said sheath.

3. The method of making skin stressed propeller and rotor blades wherein the skin is stabilized by a cellular resin core bonded thereto, comprising preforming tapered thickness metal half skins to the desired aerodynamic contour, with the thicker portions of the skins forming the nose portion of the blade section, perforating said skins adjacent the nose portions thereof, joining the half skins to form a hollow sheath for the cellular resin core, enclosing said sheath in a mold to support the sheath and to define the desired leading edge contour thereof, introducing reactant cellular forming resin core material within said skin sheath for expansion therein to form the cellular core self-bonded to the inner surfaces of the sheath formed by said skin, said core material extruding through said perforations to fill the nose portion of the mold enclosing said sheath, and cementing an abrasion resisting strip over the extruded core material to finish the leading edge portion of the blade.

References Cited in the file of this patent

UNITED STATES PATENTS

| | | |
|---|---|---|
| 2,262,029 | McKee | Nov. 11, 1941 |
| 2,326,430 | Blanchard | Aug. 10, 1943 |
| 2,366,164 | Weick | Jan. 2, 1945 |
| 2,390,761 | Watter | Dec. 11, 1945 |
| 2,428,970 | Hardy | Oct. 14, 1947 |
| 2,484,141 | Alex | Oct. 11, 1949 |
| 2,494,625 | Martin | Jan. 17, 1950 |
| 2,498,275 | Johnson | Feb. 21, 1950 |
| 2,566,701 | Griese | Sept. 4, 1951 |
| 2,648,388 | Haines et al. | Aug. 11, 1953 |

FOREIGN PATENTS

| | | |
|---|---|---|
| 550,305 | Great Britain | Jan. 1, 1943 |
| 561,716 | Great Britain | July 13, 1944 |

OTHER REFERENCES

German Plastics Practice—DeBell, Goggin and Gloor, published by DeBell and Richardson, Springfield, Mass.. 1946. Page 464 relied on.